US005679045A

United States Patent [19]

Niemi

[11] Patent Number: 5,679,045

[45] Date of Patent: Oct. 21, 1997

[54] ARRANGEMENT FOR TRANSFERRING ELECTRIC CURRENT TO A PROPULSION DEVICE PROVIDED WITH AN ELECTRIC MOTOR IN A SHIP OR EQUIVALENT

[75] Inventor: Aarno Niemi, Rauma, Finland

[73] Assignee: Aquamaster-Rauma Ltd., Rauma, Finland

[21] Appl. No.: 568,958

[22] Filed: Dec. 7, 1995

[30] Foreign Application Priority Data

Dec. 9, 1994 [FI] Finland .................................... 945788

[51] Int. Cl.[6] ..................................................... B60L 11/02

[52] U.S. Cl. ................................................................ 440/6

[58] Field of Search ............................................... 440/6, 7

[56] References Cited

U.S. PATENT DOCUMENTS

| | | | |
|---|---|---|---|
| 2,834,313 | 5/1958 | Frohlich | 440/6 |
| 3,604,967 | 9/1971 | Krulls et al. | 310/178 |
| 4,171,496 | 10/1979 | Eriksson | 310/219 |

FOREIGN PATENT DOCUMENTS

| | | | |
|---|---|---|---|
| 60326 | 9/1977 | Finland . | |
| 3141339 | 5/1983 | Germany | 440/6 |

*Primary Examiner*—Stephen Avila
*Attorney, Agent, or Firm*—Steinberg, Raskin & Davidson, P.C.

[57] ABSTRACT

An arrangement for transferring electric current to a propulsion device provided with an electric motor in a ship or equivalent. The propulsion device is rotatably mounted on the ship's hull rotatable in relation to a substantially vertical axis of rotation. At the lower end of the vertical frame of the propulsion device, a lower housing is mounted in which the electric motor is arranged to drive a propeller which revolves around a substantially horizontal shaft of rotation. The current transfer arrangement includes a stationary conductor member mounted stationarily in relation to the hull of the ship and a mobile conductor member installed on the vertical frame of the propulsion device. The stationary conductor member and the moving conductor member are one of an annular part and a part of circular section arranged inside the annular part, preferably coaxially with the annular part, so that an annular intermediate space is defined between the stationary conductor member and the mobile conductor member. In the intermediate space, an electrically conductive liquid, amorphous or equivalent medium is arranged in continuous contact with the stationary conductor member and the mobile conductor member. Electric current is transferred through the electrically conductive medium from the stationary conductor member to the mobile conductor member and therefrom to the electric motor.

20 Claims, 3 Drawing Sheets

ARRANGEMENT FOR TRANSFERRING ELECTRIC CURRENT TO A PROPULSION DEVICE PROVIDED WITH AN ELECTRIC MOTOR IN A SHIP OR EQUIVALENT

FIELD OF THE INVENTION

The invention relates to an arrangement for transferring electric current to a propulsion device provided with an electric motor in a ship or other vessel. In a ship, the propulsion device comprises a vertical frame rotatably mounted on the ship's hull in relation to a substantially vertical axis of rotation by support and rotation bearings. On the vertical frame, at the lower end of the frame, a lower housing is mounted which comprises a closed chamber, the electric motor being arranged in this chamber. The electric motor drives a propeller which revolves around a substantially horizontal shaft of rotation.

BACKGROUND OF THE INVENTION

The transfer of electric current between a stationary part and a moving part, such as a pivoting, revolving or turning part, has been accomplished in prior art constructions primarily either by means of a brush device or by means of a cable drum. The brush devices are based on various carbon-brush or metal-brush constructions in which the electric current is transferred through the brush to a contact face which rubs against the brush and moves in relation to the brush. A significant drawback of such a construction is extensive mechanical wear, on one hand, and a large requirement of space, on the other hand. Further, in these constructions, it is a substantial drawback that, in principle, there must be constant and continuous movement between the stationary part and the moving part because, especially when a carbon brush is used, prolonged stationary retention of the parts relative to one another in one position may damage the equipment. For this reason, such a current transfer arrangement based on a brush device is poorly suitable, for example, for rotatable propeller devices of ships because, when the current transfer takes place from a stationary part fixed to the hull of the ship to the vertical frame part of the propeller device, which revolves in relation to the ship's hull, the propeller device cannot be kept in one position for a long time. Rather, in order to avoid excessive wear of the current-transfer arrangement, the propeller device must be turned almost constantly.

In cable drums or towers for transferring electric current, commonly a cable is used which can be twisted and which is fixed at both ends. It is however a significant drawback of these constructions that they restrict the angle of turning or rotation between the moving part and the stationary part to a significant extent because, as the cable is fixed to the stationary part from one end and to the moving part from the opposite end, such a construction cannot be applied, for example, to a rotatable propeller device, which must be able to revolve freely through a full circle, i.e., 360°.

With respect to the prior art, reference is made to U.S. Pat. No. 3,604,967 and Finnish Patent No. 60,326 (which corresponds to U.S. Pat. No. 4,171,496), from which it can be considered that the use of liquid metal for the transfer of current is in itself known in various motor drives and as various auxiliary-rotor constructions.

OBJECTS AND SUMMARY OF THE INVENTION

It is an object of the present invention to provide a novel arrangement for transferring electric current to a propulsion device provided with an electric motor in a ship or other vessel, by means of which arrangement the drawbacks described above and related to the prior art are avoided.

In view of achieving this object and others, the invention is mainly characterized in that the current transfer arrangement comprises a stationary conductor member mounted stationarily in relation to the hull of the ship and a mobile conductor member coupled to a vertical frame of the propulsion device and which moves along with the vertical frame. The stationary conductor member and the moving conductor member comprise an annular part and a part having a circular section arranged inside the annular part, preferably a cylindrical part coaxially therewith, so that an annular intermediate space remains between the stationary conductor member and the mobile conductor member. In the intermediate space, an electrically conductive liquid, amorphous or equivalent medium is situated in continuous contact with the stationary conductor member and the mobile conductor member. The electric current passed to the stationary conductor member from a source thereof is transferred through the electrically conductive medium to the mobile conductor member and from it further to the electric motor of the propulsion device to drive the propeller.

By means of the invention, a number of remarkable advantages are obtained over the prior art, and of these advantages, for example, the following should be mentioned here. The arrangement in accordance with the invention permits a continuous and unlimited turning of the propeller device relative to the ship hull in both directions through 360°, because the arrangement in accordance with the invention does not impose any limitations on the rotating movement as are imposed, for example, in constructions of the type involving a cable drum. The arrangement prevents long-term operation of the propeller device in one direction and at high power, i.e., enables the arrangement to remain in a stat which is not possible in arrangements of electric current of the type including a carbon brush or metal brush. The current transfer arrangement in accordance with the invention produces very low voltage losses, in which case the heating of the equipment connected with the arrangement is small and the losses are substantially lower than, for example, in arrangements connected with carbon-brush and metal-brush constructions. The devices placed in vessels and connected with the present current transfer arrangement can be constructed substantially smaller than conventional brush devices, because in the arrangement of the present invention it is possible to use the entire area of the circle of the current transfer device for the transfer of current. Also, with some materials, the current density can be increased in the current transfer in comparison with prior art constructions.

The current transfer arrangement of the present invention is suitable for use both in AC and DC constructions irrespective of the voltage or the power that is used.

Further characteristic features of the invention will come out from the following detailed description of the invention.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1:
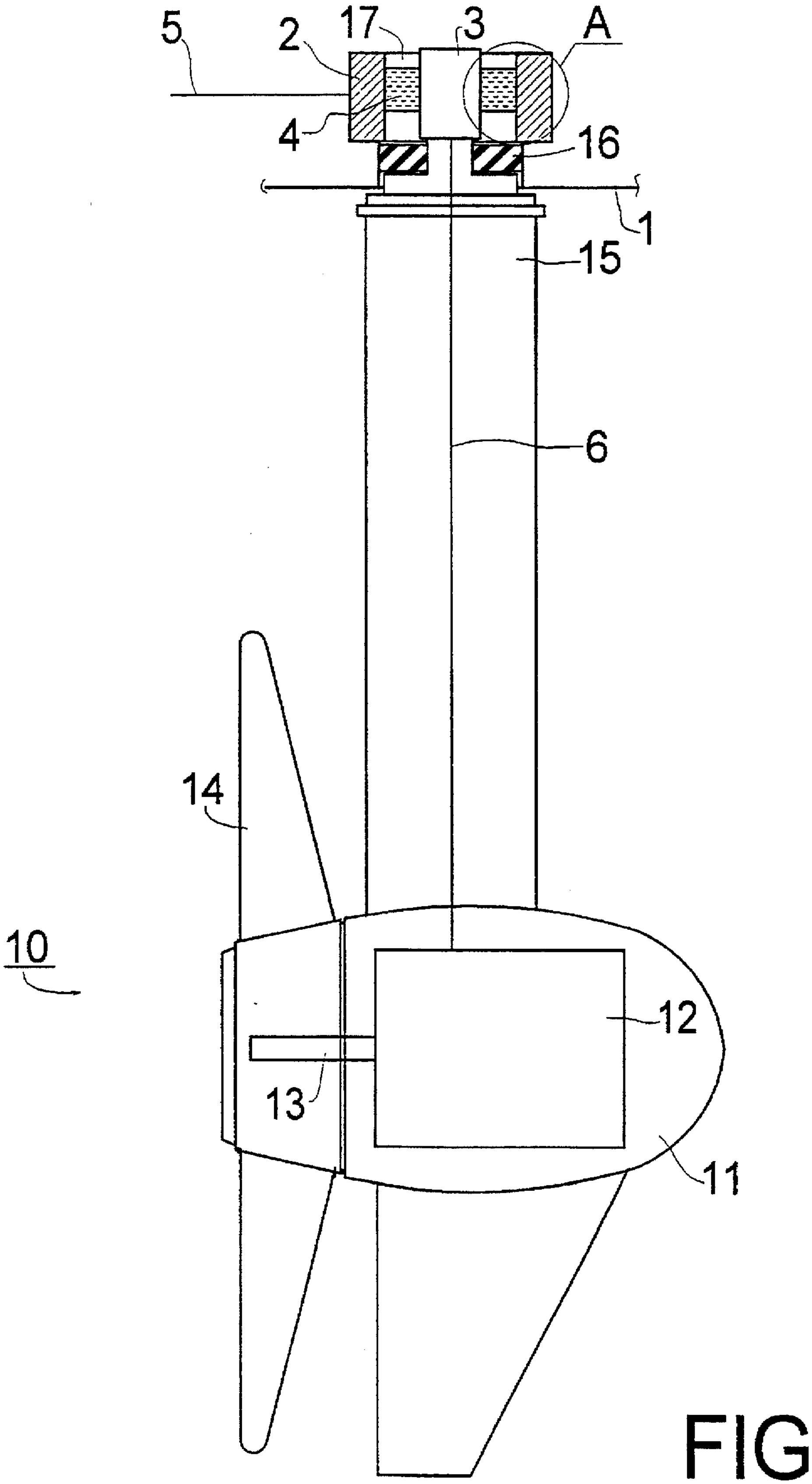
FIG. 1 is a schematic illustration of principle of the current transfer arrangement in accordance with the invention in connection with a rotatable propeller device.

Referring to the accompanying drawings wherein the same reference numerals refer to the same or similar elements, in FIG. 1, the propeller device is denoted generally with reference numeral 10. The propeller device 10 comprises a vertical frame 15 having a bottom end to which a lower housing 11 is fixed. Housing 11 is formed with a closed interior chamber. An electric motor 12 is installed in a watertight space in the lower housing 11 and drives a propeller 14 by the intermediate of a shaft 13. The propeller 14 may be attached to the shaft 13 of the electric motor 12 directly, or the electric motor 12 may drive the propeller 14, e.g., by the intermediate of a reduction gear.

The propeller device 10 is a rotatable propeller device, and so the vertical frame 15 of the propeller device is mounted on the ship so that it can revolve through 360° around a substantially vertical axis of rotation. In FIG. 1, the hull of the ship is denoted with reference numeral 1. The support and rotation bearings and the sealing members between the vertical frame 15 and the hull 1 of the ship are denoted in the figure schematically with reference numeral 16. The mechanism of rotation of the propeller device 10 is not shown in FIG. 1, because the mechanism of rotation does not constitute an essential part of the invention. Thus, the mechanism of rotation can be carried into effect in any known manner whatsoever.

The transfer of electric current from the current source (not shown) in the ship to the electric motor 12 placed in the lower housing 11 of the propeller device 10 is accomplished by an arrangement in which a stationary, preferably annular conductor member 2 is mounted on the hull 1 of the ship. Electric current is introduced to conductor member 2 by means of a cable 5 for the supply of electric current. The stationary conductor member 2 is preferably coaxial with the substantially vertical axis of rotation of the propeller device 10. On the vertical frame 15 of the propeller device 10, a second conductor member 3 is mounted, which is the mobile conductor part of the current transfer arrangement, and turns or revolves along with the propeller device 10 when the propeller device 10 is turned. The mobile conductor member 3 is mounted inside the annular stationary conductor member 2 preferably coaxially with the stationary conductor member 2, so that an annular intermediate space 17 remains between the stationary conductor member 2 and the mobile conductor member 3.

A medium 4 is arranged in the intermediate space 17 through which the electric current is transferred from the stationary conductor member 2 to the mobile conductor member 3 and from it further along an electric-transfer conductor 6 to the electric motor 12 of the propeller device 10. According to the invention, the medium 4 is an electrically conductive liquid, amorphous or equivalent medium, which forms or provides a continuous, constant coupling between the stationary conductor member 2 and the mobile conductor member 3 in the current transfer arrangement.

One particular embodiment of the current transfer arrangement in accordance with the invention is shown schematically in FIG. 2 and is constructed as follows. In the intermediate space 17 between the stationary conductor part 2 and the mobile conductor part 3, a pair of rings 20,22;21,23 is arranged so that the first ring 20,22 of the pair of rings is in contact with and/or connected to the stationary conductor member 2, and the second ring 21,23 is in contact with and/or connected to the mobile conductor member 3. The first ring 20,22, which is in contact with the stationary conductor member 2, defines a cavity space which is filled with the electrically conductive medium 4, and the second ring 21,23, which is in contact with the mobile conductor member 3, penetrates into the cavity to engage the electrically conductive medium 4 therein. In this case, the medium 4 forms a current-conductive part between the rings 20,22;21,23 in the pair of rings.

As the electrically conductive medium 4, it is possible to use, for example, some liquid metal or metal alloy, such as gallium-indium or mercury. The electrically conductive medium 4 is protected from oxidation by means of a protective liquid 24 arranged on top of the medium 4, and the pair of rings is protected from outside contamination by means of seal and shield constructions 25,26. In the intermediate space 17, it is also possible to arrange a number of pairs of rings placed one above the others between or around which pairs of rings an electrically conducting medium is arranged. In the case of several pairs of rings, it is possible to pass several current paths or current circuits to the electric motor 12.

The current transfer arrangement in accordance with the invention is suitable for propulsion devices of all sizes in a variety of different vessels in which the electric current must be supplied to the electric motor contained in such devices by the intermediate of a rotatable device. In a rotatable propeller device 10, which is shown in FIG. 1, the current transfer arrangement is constructed so that the equipment is mounted in compliance with the axis of rotation of the propeller device 10 substantially vertically, and then the mobile or rotatable conductor member 3 is also vertically arranged, and the pairs of current transfer rings 20,22;21,23 placed in the intermediate space 17, as shown in FIG. 2, are horizontal. This facilitates the retention of the liquid medium 4 considerably, for, as is shown in FIG. 2, the lower ring 20,22 in the pair of rings can be shaped as a cup-shaped groove in which there are sufficiently high walls 22 even in view of heeling of the ship. Likewise, it is readily possible to arrange space for the protective liquid 24 to be placed on top of the liquid medium 4, which protective liquid is, for example, glycol. Replenishment of the medium 4 and the protective liquid 24 for the current transfer device can also be arranged to be very simple, and even automatic. As shown in FIG. 2, the upper ring 21,23 of the pair of rings can be shaped so that it floats constantly in the liquid space formed by the lower ring 20,22, either completely or partly.

Figure 2:
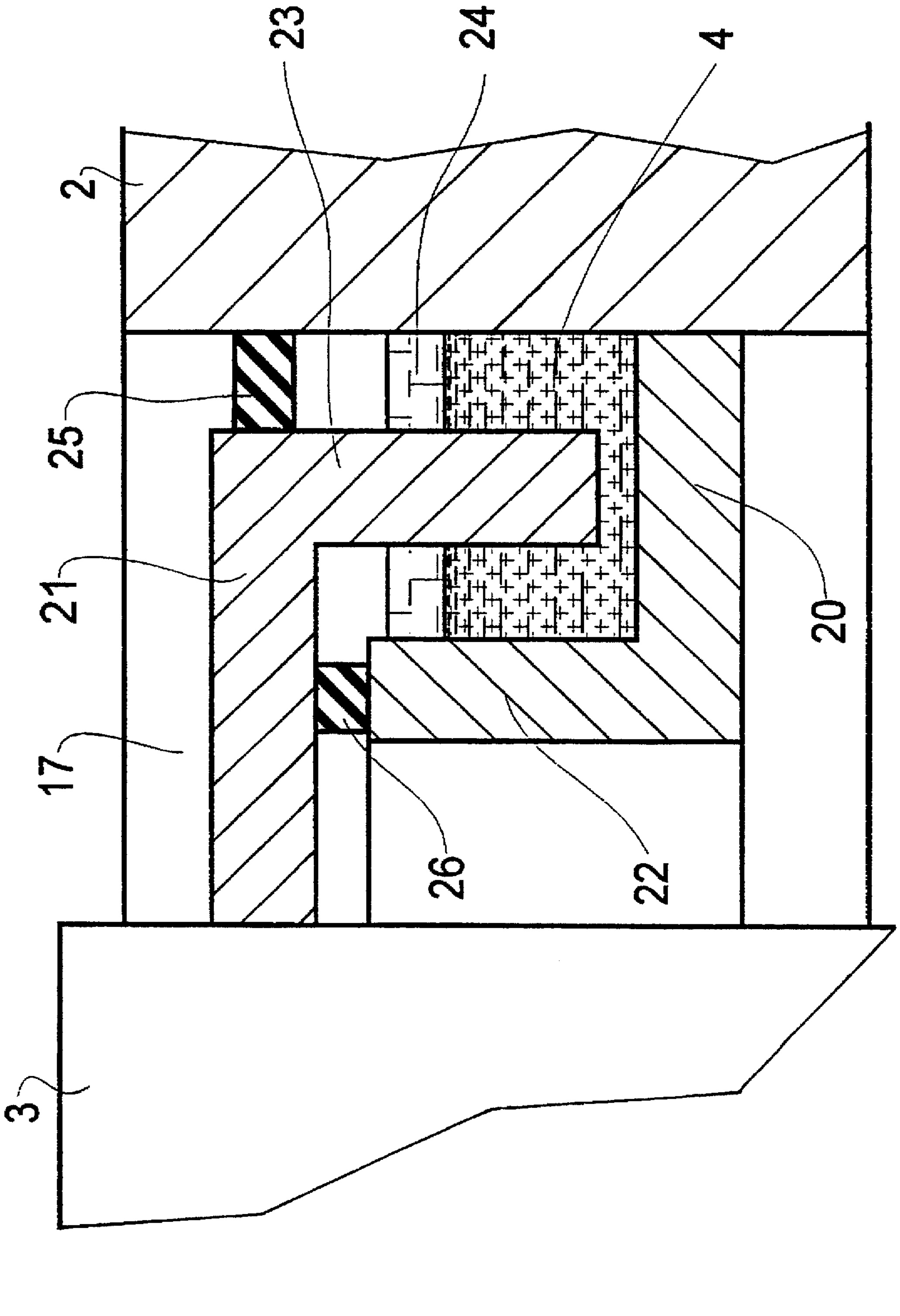
FIG. 2 is a schematic illustration of the detail A in FIG. 1.
Figure 3:
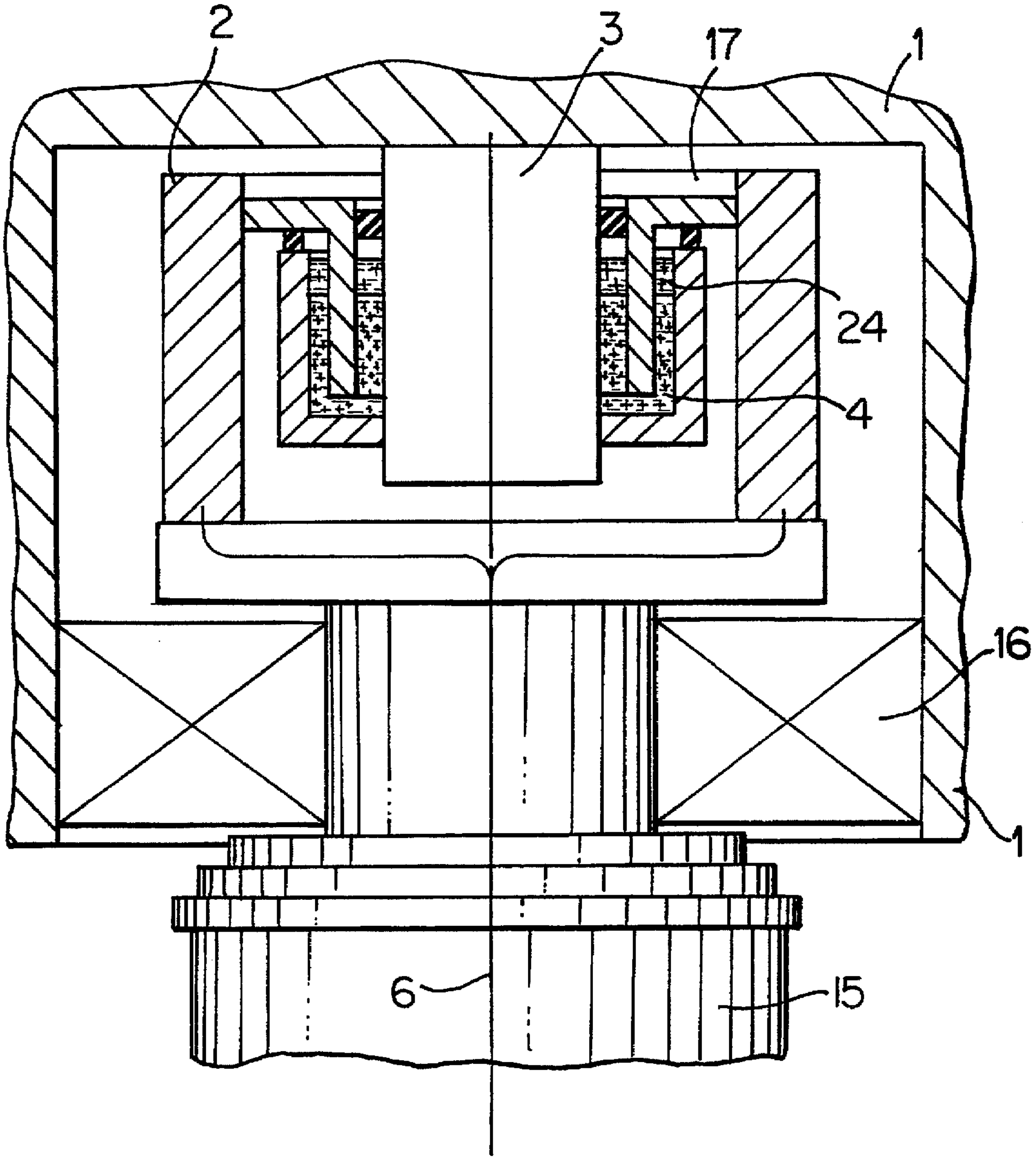
FIG. 3 is an illustration of an alternative embodiment of the electric-current transfer arrangement in accordance with the invention.

In the embodiment shown in FIG. 3, the stationary conductor member and the mobile conductor member of the current transfer equipment are arranged in a manner inverse to the illustrated embodiment in FIG. 2. In such an embodiment, a mobile conductor member 2 comprises an annular ring attached to the vertical frame 15 of the propeller device in whose interior, preferably coaxially with the ring, a stationary member 3 placed in a stationary manner on the hull 1 of the ship is arranged so that, in the way shown in the figure, an annular intermediate space remains between the stationary and the mobile conductor members 2,3. The mobile conductor member 2 is attached by a conductor lead 6 to the electric motor of the propulsion device. As in the embodiment of FIG. 2, an electrically conductive medium is arranged in the intermediate space between conductor members 2 and 3 and in other respects, the embodiment of FIG. 3 is the same as that in FIG. 2.

The examples provided above are not meant to be exclusive. Many other variations of the present invention would be obvious to those skilled in the art, and are contemplated to be within the scope of the appended claims. Other vessels in which the current-transfer arrangement in accordance with the invention may be placed include blimps or any other vessel movable in a fluid medium.

I claim:

1. An arrangement for transferring electric current to an electric motor in a propulsion device in a ship, the propulsion device including a propeller and a rotatable vertical frame on which the electric motor is arranged to drive the propeller, comprising a first conductor member mounted in a stationary position in relation to the ship, said first conductor member being electrically coupled to an electric source, a second conductor member arranged on the vertical frame and movable upon rotation of the vertical frame, said second conductor member being electrically coupled to the electric motor, one of said first and second conductor members comprising an annular part and the other of said first and second conductor members comprising a substantially cylindrical part arranged inside said annular part to define an annular intermediate space between said first and second conductor members, and means for retaining an electrically conductive liquid or an electrically conductive amorphous medium in said intermediate space in continuous contact with said first and second conductor members, electric current being transferred from said first conductor member through the electrically conductive medium to said second conductor member and to the electric motor.

2. The arrangement of claim 1, wherein said first conductor member comprises said annular part and said second conductor member comprising said substantially cylindrical part arranged inside said annular part.

3. The arrangement of claim 1, wherein said second conductor member comprises said annular part and said first conductor member comprising said substantially cylindrical part arranged inside said annular part.

4. The arrangement of claim 1, wherein said electrically conductive medium retaining means comprises at least one pair of cooperating rings arranged in said intermediate space between said first and second conductor members, said at least one pair of rings comprising a cavity filled with said electrically conductive medium.

5. The arrangement of claim 4, wherein each of said at least one pair of rings comprises a first ring attached to said first conductor member and a second ring attached to said second conductor member, said rings being electrically coupled to one another through said electrically conductive medium.

6. The arrangement of claim 5, wherein said first ring includes a cup-shaped groove extending from an exterior surface thereof to thereby define said cavity for said electrically conductive medium, and said second ring comprises a projecting portion extending at least partially into said cavity.

7. The arrangement of claim 1, wherein said electrically conductive medium comprises a liquid metal or a metal alloy.

8. The arrangement of claim 1, wherein said electrically conductive medium is gallium-indium.

9. The arrangement of claim 1, wherein said electrically conductive medium is mercury.

10. The arrangement of claim 1, further comprising a protective liquid arranged in said intermediate space between said first and second conductor members on an exterior surface of said electrically conductive medium.

11. The arrangement of claim 10, wherein said protective liquid is glycol.

12. The arrangement of claim 1, wherein said cylindrical part is coaxial with said annular part.

13. The arrangement of claim 1, wherein said retaining means comprise sealing and shielding means for sealing the electrically conductive liquid or medium in said intermediate space and shielding the electrically conductive liquid or medium from contamination.

14. The arrangement of claim 1, wherein said annular part has an inner surface defining a circular interior space and said cylindrical part is arranged inside the circular interior space defined by said annular part.

15. An arrangement for transferring electric current to an electric motor in a propulsion device in a ship, the propulsion device including a propeller and a rotatable vertical frame on which the electric motor is arranged to drive the propeller, comprising a first conductor member mounted in a stationary position in relation to the ship, said first conductor member being electrically coupled to an electric source, a second conductor member arranged on the vertical frame and movable upon rotation of the vertical frame, said second conductor member being electrically coupled to the electric motor, one of said first and second conductor members comprising an annular part and the other of said first and second conductor members comprising a substantially cylindrical part arranged inside said annular part to define an annular intermediate space between said first and second conductor members, means for retaining an electrically conductive liquid or an electrically conductive amorphous medium in said intermediate space in continuous contact with said first and second conductor members, electric current being transferred from said first conductor member through the electrically conductive liquid or medium to said second conductor member and to the electric motor, and a protective liquid arranged in said intermediate space between said first and second conductor members on an exterior surface of said electrically conductive medium, said protective liquid protecting the electrically conductive medium from oxidation.

16. The arrangement of claim 15, wherein said protective liquid is glycol.

17. The arrangement of claim 15, wherein said electrically conductive medium is selected from the group consisting of gallium-indium and mercury.

18. An arrangement for transferring electric current to an electric motor in a propulsion device in a ship having a hull, the propulsion device including a propeller and a rotatable vertical frame on which the electric motor is arranged to drive the propeller, comprising a first conductor member mounted in a stationary position in the hull of the ship, means for electrically coupling said first conductor member to an electric source, a second conductor member arranged on the vertical frame and movable upon rotation of the vertical frame, means for electrically coupling said second conductor member to the electric motor, support and rotation bearings for supporting said vertical frame in the hull of the ship, one of said first and second conductor members comprising an annular part having an inner surface defining a circular interior space and the other of said first and second conductor members comprising a substantially cylindrical part arranged inside the circular interior space defined by said annular part to define an annular intermediate space between said first and second conductor members, and means for retaining an electrically conductive liquid or an electrically conductive amorphous medium in said intermediate space in continuous contact with said first and second conductor members, electric current being transferred from said first conductor member through the electrically conductive liquid or medium to said second conductor member and to the electric motor.

19. The arrangement of claim 18, wherein said electrically conductive medium retaining means comprises at least one pair of cooperating rings arranged in said intermediate space between said first and second conductor members, said at least one pair of rings comprising a cavity filled with said electrically conductive medium.

20. The arrangement of claim 19, wherein each of said at least one pair of rings comprises a first ring attached to said first conductor member and a second ring attached to said second conductor member, said rings being electrically coupled to one another through said electrically conductive medium, said first ring including a cup-shaped groove extending from an exterior surface thereof to thereby define said cavity for said electrically conductive medium, and said second ring comprising a projecting portion extending at least partially into said cavity.

* * * * *